US012465921B2

(12) United States Patent
Chen et al.

(10) Patent No.: US 12,465,921 B2
(45) Date of Patent: Nov. 11, 2025

(54) DEVICE FOR PRODUCING MACHA POWDER

(71) Applicant: NANCHANG UNIVERSITY, Nanchang (CN)

(72) Inventors: Jun Chen, Nanchang (CN); Lizhen Deng, Nanchang (CN); Deyu Jiang, Nanchang (CN); Taotao Dai, Nanchang (CN); Chengliang Lv, Nanchang (CN); Chengmei Liu, Nanchang (CN)

(73) Assignee: NANCHANG UNIVERSITY, Nanchang (CN)

( * ) Notice: Subject to any disclaimer, the term of this patent is extended or adjusted under 35 U.S.C. 154(b) by 280 days.

(21) Appl. No.: 18/327,078

(22) Filed: Jun. 1, 2023

(65) Prior Publication Data

US 2024/0399384 A1 Dec. 5, 2024

(51) Int. Cl.
*B02C 17/16* (2006.01)
*B02C 17/18* (2006.01)

(52) U.S. Cl.
CPC .......... *B02C 17/163* (2013.01); *B02C 17/161* (2013.01); *B02C 17/1815* (2013.01); *B02C 17/188* (2013.01)

(58) Field of Classification Search
CPC . B02C 17/163; B02C 17/161; B02C 17/1815; B02C 17/188; B02C 17/1885; B02C 11/08; B02C 9/04
See application file for complete search history.

(56) References Cited

U.S. PATENT DOCUMENTS 6,244,528 B1 * 6/2001 Wallis ........................ B02C 9/00 241/23

FOREIGN PATENT DOCUMENTS

CN 108636528 A * 10/2018 ............. B02C 17/16
EP 0324400 A2 * 7/1989

OTHER PUBLICATIONS

English translate (CN108636528A), retrieved date Apr. 30, 2025.*
English translate (EP0324400A2), retrieved date Apr. 30, 2025.*

* cited by examiner

*Primary Examiner* — Mohammed S. Alawadi

(57) ABSTRACT

A device that effectively produce matcha powder is provided and includes: a stirred media mill grinding portion, having a grinding chamber inside, wherein a side of the stirred media mill grinding portion defines an outlet port; a pin bar, rotatably received in the grinding chamber, wherein an outer circumference of the pin bar defines an opening, communicated with the grinding chamber; an air classifier, connected to the outlet port through a first tube assembly and defining a first output port and a second output port; a storage portion, connected to the first output port; a collector portion, connected to the second output port through a second tube assembly; and a wind guider, wherein an air outlet of the wind guider is connected to the outlet port and an interior of the storage portion to create a negative pressure environment.

10 Claims, 3 Drawing Sheets

DEVICE FOR PRODUCING MACHA POWDER

TECHNICAL FIELD

The subject matter disclosed herein relates to the field of food engineering, more specifically, it pertains to a device designed to efficiently produce matcha powder.

BACKGROUND

Matcha is a high-quality, pure, and ultra-fine powdered tea product made from milled tea by performing an ultra-fine crushing process. Traditionally, the production of matcha involves two critical steps: steaming the tea leaves to halt oxidation and low-temperature grinding. However, the use of a natural stone mill for grinding results in low productivity and a complex milling process. As a result, modern processing methods have been adopted to replace the traditional approach.

Consequently, in the art, the utilization of a ball mill as a substitute for manual grinding has been explored. The ball mill exhibits several drawbacks, including the inability to achieve continuous production and low production efficiency. Additionally, the grinding process generates a significant amount of heat, which can elevate temperatures within the cavity. As a result, this excessive heat may impact the color, aroma, and taste of tea powder, resulting in diminished product quality.

To address the aforementioned drawbacks associated with the use of a ball mill, a stirred media mill grinding technique has been developed. However, it is important to note that stirred media mill is primarily suitable for solid suspended particles dispersed in a liquid or high viscosity slurry, as well as materials that may be challenging to disperse. When applying media mill to process and grind dry powders, certain issues arise. The resulting products with varying particle sizes may prove difficult to separate effectively, hinder easy collection, exhibit a low harvest rate, introduce time-consuming procedures, and impede continuous production.

SUMMARY OF THE INVENTION

The present disclosure provides a device to effectively produce *Macha* powder, aiming to address the technical challenge encountered in conventional grinding devices where products with varying particle sizes are difficult to separate and hinder continuous production.

According to an aspect, the present disclosure provides a device that effectively produce matcha powder, including:

a stirred media mill grinding portion, having a grinding chamber inside, wherein the grinding chamber is configured to receive raw tea flakes and a grinding media, a side of the stirred media mill grinding portion defines an outlet port;

a pin bar, rotatably received in the grinding chamber, wherein the pin bar is configured to stir the raw tea flakes and the grinding media in the grinding chamber, enabling the grinding media to initially grind the raw tea flakes; the pin bar is hollow inside, and an outer circumference of the pin bar defines an opening, communicated with the grinding chamber;

an air classifier, connected to the outlet port through a first tube assembly and defining a first output port and a second output port;

a storage portion, connected to the first output port;

a collector portion, connected to the second output port through a second tube assembly; and a wind guider, wherein an air outlet of the wind guider is connected, via a third tube assembly, to the outlet port and an interior of the storage portion to create a negative pressure environment.

In some embodiments, the device further includes: a material feeding assembly, wherein the material feeding assembly is connected to the grinding chamber to allow the raw tea flakes and the grinding media to enter the grinding chamber through the material feeding assembly; and the material feeding assembly includes:

an inlet tube, connected to a top of the stirred media mill grinding portion and communicated with the grinding chamber;

a vacuum feeding pump, wherein a lower end of the vacuum feeding pump is connected to the inlet tube;

an inlet hopper, connected to an upper end of the vacuum feeding pump, wherein an inlet baffle is arranged inside the inlet hopper; and an inlet baffle controller, electrically connected to the inlet baffle.

In some embodiments, the device further includes: a first valve assembly, wherein the first valve assembly includes:

a control portion, electrically connected to the inlet baffle controller;

a first valve, arranged on the second tube assembly and electrically connected to the control portion; and a second valve, communicated with the air output of the wind guider and electrically connected to the control portion.

In some embodiments, a screener is arranged inside the pin bar and is connected with the outlet port, the screener and the pin bar are coaxially arranged with each other, and the screener is configured to filter the grinding media.

In some embodiments, the stirred media mill grinding portion comprises an outer shell, an inner shell and a cooling case, the cooling case is disposed between the outer shell and the inner shell, and the inner shell defines the grinding chamber inside.

In some embodiments, the device further includes:

a filter, arranged on an air inlet of the wind guider;

a second valve assembly, arranged on the third tube assembly and electrically connected to the control portion;

a collector box, configured to receive the collector portion and all or a part of the filter, wherein the air inlet of the wind guider is located inside the collector box, and the air outlet of the wind guider is located outside the collector box.

In some embodiments, the second valve assembly includes:

a third valve, arranged on the third tube assembly and electrically connected to the control portion; and a fourth valve, connected to the collector portion and electrically connected to the control portion.

In some embodiments, the device further includes:

an outlet baffle, openably arranged on the collector box; and an outlet baffle controller, electrically connected to the control portion and the outlet baffle.

In some embodiments, the device further includes:

a first air purification assembly, connected to an interior of the material feeding assembly to purify air entering the material feeding assembly; and/or a second air purification assembly, connected to the second tube assembly to purify air entering the second tube assembly; and/or a third air purification assembly, connected to the third tube assembly, wherein the third air purification assembly is disposed between the second valve assembly and the air outlet of the wind guider and is configured to purify air entering the third tube assembly.

In some embodiments, the device further includes: a motor, wherein a power output end of the motor is connected to the pin bar to drive the pin bar to rotate.

Following benefits may be achieved based the present disclosure.

When raw tea material is initially grinded by a grinding media within a grinding chamber, a wind guider is turned on to generate a negative pressure. A product of the initial grinding enters an inside of a pin bar through an opening under the negative pressure. Further, the product enters an in side of an airflow classifier successively via an outlet port and a first tube assembly. The product is classified by the airflow classifier. A part of the product of the initial grinding that does not meet requirements of a particle size enters a storage through a first output port, such that the other part of the product of the initial grinding that meets the requirements of the particle size may enters a collection portion successively through a second output port and a second tube assembly. In this way, grinding products of different particle sizes may be automatically separated from each other effectively, the products may be produced continuously, and a production efficiency may be improved.

BRIEF DESCRIPTION OF THE DRAWINGS

In order to more clearly illustrate the technical solutions in the embodiments of the present disclosure or in related art, the accompanying drawings for description of the embodiments or the related art are briefly illustrated in the following. In all of the accompanying drawings, similar elements or portions are generally identified by similar reference numerals. In the accompanying drawings, the components or portions may not be necessarily drawn to actual scales.

REFERENCE NUMERALS

Figure 1:
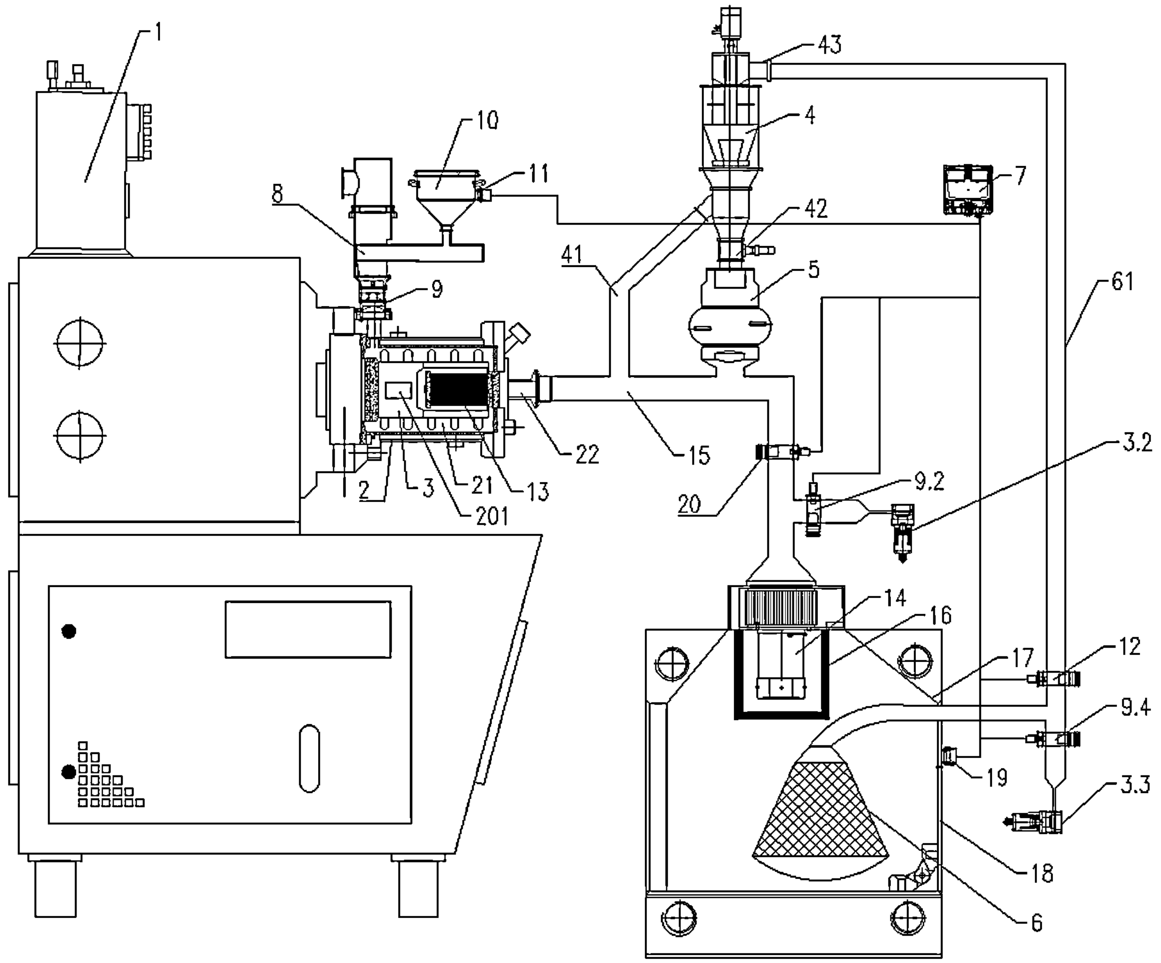
FIG. 1 is a structural schematic view of a device that effectively produces matcha powders according to an embodiment of the present disclosure.

1—motor, 2—stirred media mill grinding section, 21—grinding chamber, 201—opening, 22—outlet port, 23—outer shell, 24—inner shell, 25—cooling case, 3—pin bar, 4—airflow classifier, 41—first tube assembly, 42—first output port, 43—second output port, 5—storage device, 6—collector portion, 7—control portion, 8—vacuum feeding pump, 9—inlet tube, 10—inlet hopper, 11—inlet baffle controller, 12—first valve, 13—screener, 14—wind guider, 15—third tube assembly, 16—filter, 17—collector box, 18—outlet baffle, 19—outlet baffle controller, 20—third valve, 61—second tube assembly, 3.2—second air cleaner, 3.3—first air cleaner, 9.2—second valve, 9.4—fourth valve.

The realization of the purpose, functional features and advantages of the present disclosure will be further described by referring to the accompanying drawings and the embodiments.

DETAILED DESCRIPTION

The technical solutions in the embodiments of the present disclosure will be clearly and completely described below by referring to the accompanying drawings in the embodiments of the present disclosure. Obviously, the described embodiments are only some of but not all of the embodiments of the present disclosure. Based on the embodiments in the present disclosure, all other embodiments obtained by any ordinary skilled person in the art without making creative work shall fall within the scope of the present disclosure.

It should be noted that all directional indications (such as up, down, left, right, forward, back . . . ) in the embodiments of the present disclosure are used only to explain the relative position relationship, movement, and so on, between components in a particular attitude. When the particular attitude is changed, the directional indications may change accordingly.

In the present disclosure, unless otherwise expressly specified and limited, the terms “connection”, “fixed”, and so on, shall be understood in a broad sense. For example, “fixed” may be a fixed connection, or a detachable connection, or two components being configured as one piece. The connection may be mechanical connection, or electrical connection; direct connection, or indirect connection through an intermediate media, or internal connection between two components, or two components having an interaction relationship. Any ordinary skilled person in the art shall understand the specific meaning of the above terms in the present disclosure case-by-case.

In addition, for description involving “first”, “second”, and so on, in an embodiment of the present disclosure, the “first”, “second”, and so on, are used for descriptive purposes only, and shall not be interpreted as indicating or implying its relative importance or implicitly specifying the number of technical features indicated. Thus, features qualified with “first” and “second” may explicitly or implicitly include at least one such feature. In addition, the term “and/or” in the specification has three parallel solutions. For example, “A and/or B” includes A solution, or B solution, or A and B simultaneously. In addition, the technical solutions between the various embodiments can be combined with each other, as long as the combined solution can be achieved by the ordinary skilled person in the art. When combination of technical solutions appear to contradict each other or can not be achieved, such a combination of technical solutions does not exist, and is not within the scope of the present disclosure.

Embodiment I

Figure 2:
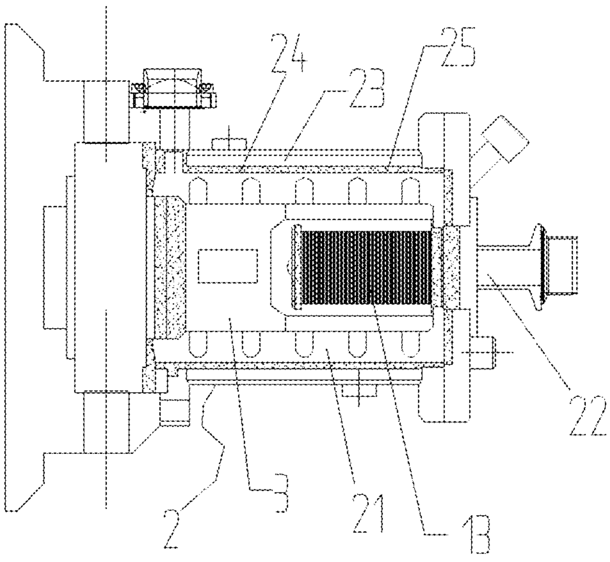
FIG. 2 is a structural schematic view of an interior of a stirred media mill grinding portion according to an embodiment of the present disclosure.

As shown in FIG. 1 and FIG. 2, a device that can effectively make matcha powders is provided and includes a stirred media mill grinding portion 2, a pin bar 3, an air classifier 4, a storage device 5, a collector portion 6, and a wind guider 14. The stirred media mill grinding portion 2 has a grinding chamber 21 inside. The grinding chamber 21 is configured to receive a raw tea sheet and a grinding media.

A side of the stirred media mill grinding portion 2 defines an outlet port 22. The pin bar 3 is rotatably received in the grinding chamber 21. The pin bar 3 is configured to stir the raw tea flakes and the grinding media (including zirconia beads and so on) received in the grinding chamber 21, such that the raw tea flakes may be initially grinded by the grinding media.

The pin bar 3 is hollow inside. An outer periphery of the pin bar 3 has an opening 201 communicated with the grinding chamber 21. The air classifier 4 is connected to the outlet port 22 through a first tube assembly 41. The air classifier 4 defines a first output port 42 and a second output port 43. A parameter of the air classifier 4 may be adjusted according to demands to allow products of different particle sizes to be separated from each other. The storage device 5 is connected to the first output port 42. The collector portion 6 is connected to the second output port 43 through a second tube assembly 61. In the present embodiment, the first output port 42 is located below the second output port 43 in a height direction of the airflow classifier 4. An air outlet of the wind guider 14 is communicated with the outlet port 22 and an inside of the storage device 5 through a third tube assembly 15, such that a negative pressure environment is generated.

In the present embodiment, after the raw tea flakes are initially grinded by the grinding media in the grinding chamber 21, the wind guider 14 is turned on to form the negative pressure environment. The initial grinding products enter the inside of the pin bar 3 through the opening 201 under the negative pressure. The initial grinding products further enters the airflow classifier 4 successively via the outlet port 22 and the first tube assembly 41. The initial grinding products are classified by the airflow classifier 4, such that a part of the initial grinding products that do not meet the particle size requirements (such as a particle size greater than or equal to 20 μm) enter the storage device 5 through the first output port 42, while the other part of the initial grinding products that meet the particle size requirements (such as particle size greater than or equal to 20 μm) enter the collector portion 6 successively via the second output port 43 and the second tube assembly 61. In this way, grinding products of different particle sizes may be automatically separated from each other effectively, the products may be produced continuously, and a production efficiency may be improved.

In an embodiment, the device further includes a material feeding assembly. The material feeding assembly is connected to the grinding chamber 21 to allow the raw tea flakes and the grinding media to enter the grinding chamber 21 through the material feeding assembly. The material feeding assembly includes an inlet tube 9, a vacuum feeding pump 8, an inlet hopper 10 and an inlet baffle controller 11. The inlet tube 9 is connected to a top of the stirred media mill grinding portion 2 and is communicated with the grinding chamber 21. A lower end of the vacuum feeding pump 8 is connected to the inlet tube 9. The inlet hopper 10 is connected to an upper end of the vacuum feeding pump 8. An inlet baffle is arranged inside the inlet hopper 10. The inlet baffle controller 11 is electrically connected to the inlet baffle.

In the present embodiment, when the material is being fed, the inlet baffle controller 11 may be controlled by a control portion 7, and the inlet baffle controller 11 further controls a state of the vacuum feeding pump 8, enabling the vacuum feeding pump 8 to be in an open state/closed state. When the vacuum feeding pump 8 is in the open state, the raw tea flakes and grinding media stored in the inlet hopper 10 may enter the grinding chamber 21 through the inlet tube 9. When the vacuum feeding pump 8 is in the closed state, the raw tea flakes and grinding media stored in the inlet hopper 10 cannot enter the grinding chamber 21 through the inlet tube 9. In the present embodiment, the material feeding stage is optimized, the vacuum feeding pump 8 is controlled by the control portion 7 automatically, such that an amount of material that is fed may be controlled accurately.

In an embodiment, the device further includes a first valve assembly. The first valve assembly includes the control portion 7, a first valve 12 and a second valve 9.2. The control portions 7 is electrically connected to the inlet baffle controller 11. The first valve 12 is arranged on the second tube assembly 61 and is electrically connected to the control portion 7. The second valve 9.2 is communicated with an air output port of the wind guider 14 and is electrically connected to the control portion 7.

An operation process of the device is as follows.

Before in use, the control portion 7 controls the state of the vacuum feeding pump 8 via the inlet baffle controller 11, such that the vacuum feeding pump 8 is in the closed state. In this case, the raw tea flakes and the grinding media is placed in the inlet hopper 10. Since the vacuum feeding pump 8 is in the closed state, the raw tea flakes and the grinding media can only be placed in the inlet hopper 10 and cannot enter the grinding chamber 21 through the inlet tube 9.

to, through the control section 7 to make the vacuum feed pump 8 in the open state, the vacuum feed pump 8. The vacuum feeding pump 8 is controlled by the control portion 7 to be in the open state. The raw tea material and the grinding media stored in the inlet hopper 10 can enter the grinding chamber 21 through the inlet tube 9. Further, the pin bar 3 is rotated to stir and mix the raw tea material and the grinding media disposed between a wall of the grinding chamber 21 and an outer wall of the pin bar 3, such that the raw tea material and the grinding media may move centrifugally. During the stirring and mixing, the grinding media performs an initial grinding on the raw tea material to grind the raw tea flakes to a certain extent.

After the initial grinding is completed, the wind guider 14 is turned on, and the initial grinding products enter the interior of the pin bar 3 through the opening 201 due to the negative pressure. At the same time, the control portion 7 controls the first valve 12 and the second valve 9.2 to open, such that a pathway between the second tube assembly 61 and the material collector portion 6 is available, and the initial grinding products enter the airflow classifier 4 successively through the outlet port 22 and the first tube assembly 41. The initial grinding products may be classified by the airflow classifier 4. In this way, a part of the initial grinding products (i.e., coarse powders) which do not meet the particle size requirements enter the storage device 5 via the first output port 42; while the other part of the initial grinding products (fine powders) which meet the particle size requirements enter the collector portion 6 successively via the second output port 43 and the second tube assembly 61.

In an embodiment, a screener 13 is arranged inside the pin bar 3 and is connected with the outlet port 22. The screener 13 and the pin bar 3 are coaxially arranged with each other. The screener 13 is configured to filter the grinding media.

In the present embodiment, a cross section of the screener 13 may be an equilateral polygon. The screener 13 and the pin bar 3 are coaxially arranged with each other. Therefore, when the initial grinding products inside the pin bar 3 enter the airflow classifier 4 due to the negative pressure successively through the outlet port 22 and the first tube assembly 41, the grinding media may be filtered through the screener 13, such that only the initial grinding products enter the airflow classifier 4 successively through the outlet port 22 and the first tube assembly 41, and effective separation of the grinding media from the grinding products is achieved. To be noted that, the screener 13 may be made of Hastelloy in a food grade.

To be noted that, an end of the pin bar 3 is movably connected to a side wall of the grinding chamber 21 and is mechanically sealed to the side wall. The other end of the pin bar 3 is not connected to the other side wall of the grinding chamber 21. Only the screener 13 is connected to the other side wall of the grinding chamber 21. Therefore, a gap is defined between an inner wall of the pin bar 3 and an outer wall of the screen 13, and the screener 13 does not rotate as the pin bar 3 rotates.

In an embodiment, the stirred media mill grinding portion 2 includes an outer shell 23, an inner shell 24 and a cooling case 25. The cooling case 25 is disposed between the outer shell 23 and the inner shell 24. The inner shell 24 has the grinding chamber 21 inside.

In the present embodiment, the cooling case 25 may be a double-layer structure having a good cooling effect. The inner shell 24 may be made of silicon carbide ceramic material. Therefore, while grinding the tea to produce matcha, heat may be absorbed by the cooling case 25 in time to reduce any adverse effect on the particle sizes and colors of matcha caused by high temperatures. In addition, the inner shell 24 is made of silicon carbide ceramic material, and therefore the inner shell 24 has high hardness, is resistant to corrosion, is prevented from being rust, and is safe and hygienic. During the grinding process, a low loss may be resulted, the silicon carbide ceramic material may be especially suitable for grinding food materials.

In an embodiment, the device further includes a filter 16, a second valve assembly and a collector box 17. The filter 16 is arranged on the air inlet of the wind guider 14. The second valve assembly is arranged on the third tube assembly 15 and is electrically connected to the control portion 7. The collector box 17 is configured to receive the collector portion 6 and all or a part of the filter 16. The air inlet of the wind guider 14 is located inside the collector box 17, and an air outlet of the wind guider 14 is located outside the collector box 17.

In the present embodiment, after the part of the initial grinding products that do not meet the particle size requirements enter the storage device 5, the control portion 7 controls the second valve assembly to open, such that a path of the third tube assembly 15, the outlet port 22, and the interior of the storage device 5 is available, further enabling a part of airflow generated by the wind guider 14 to flow into the interior the storage device 5 to drive the part of the initial grinding products, which do not meet the particle size requirements and are received inside the storage device 5, to enter the grinding chamber 21 again successively through the first tube assembly 41 and outlet port 22 to be grinded for a second time. A part of the airflow enters the grinding chamber 21 through the outlet port 22 to impact the powders, which are in the grinding chamber 21 and are stacked on the filter 13, preventing the filter 13 from being blocked, such that multiple effects can be achieved. To be noted that, the screener 16 may be a HEPA ring-shaped screener.

Therefore, the device is highly automated. A part of the matcha products that are the inadequately grinded may be returned to the grinding chamber 21 to be further grinded. The material may not be mixed with the air during production. Therefore, almost no waste is generated, materials may be grinded adequately, and a yielding rate is improved.

In an embodiment, the second valve assembly includes a third valve 20 and a fourth valve 9.4. The third valve 20 is arranged on the third tube assembly 15 and is electrically connected to the control portion 7. The fourth valve 9.4 is connected to the collector portion 6 and is electrically connected to the control portion 7.

In the present implementation, both the third valve 20 and the fourth valve 9.4 are centrally controlled by the control portion 7. In this way, a change in airflow directions within the grinding chamber 21 is achieved by controlling opening and closing of different valves, such that the airflow direction may not be a single direction, the grinding chamber 21 may not be blocked, and the part of the grinding products that do not meet requirements may enter the grinding chamber 21 to be further grinded. The device may be highly practicable.

In an embodiment, the device further includes an outlet baffle 18 and an outlet baffle controller 19. The outlet baffle 18 is openably arranged (such as hingedly connected) on the collector box 17. The outlet baffle controller 19 is electrically connected to the control portion 7 and the outlet baffle 18.

In the present embodiment, when sufficient initial grinding products are collected in the collector portion 6. The control portion 7 controls, via the outlet baffle controller 19, the outlet baffle 18 to be open, and the collector portion 6 may be removed from the collector box 17 for replacement.

In an embodiment, the device further includes: a first air purification assembly, and/or a second air purification assembly, and/or a third air purification assembly. The first air purification assembly is connected to an interior of the material feeding assembly to purify the air entering the material feeding assembly. The second air purification assembly is connected to the second tube assembly 61 to purify the air entering the second tube assembly 61. The third air purification assembly is connected to the third tube assembly 15 and is disposed between the second valve assembly and the air outlet of the wind guider 14. The third air purification assembly is configured to purify the air entering the third tube assembly 15.

In the present embodiment, the airflow in each tube may be effectively purified by each air purification assembly, and the quality of the products may be improved. The second air purification assembly includes a first air purifier 3.3. The third air purification assembly includes a second air purifier 3.2.

In an embodiment, the device further includes a motor 1. A power output end of the motor 1 is connected to the pin bar 3 to drive the pin bar 3 to rotate.

In the present embodiment, the power output end of the motor 1 may be connected to the pin bar 3 through a drive mechanism (such as through a strapped drive mechanism). When the motor 1 is activated, the pin bar 3 is driven to rotate automatically. The device is highly automated.

A process of making matcha by using the device of the present disclosure is described in the following.

Embodiment II 30 kg of autumn raw tea flakes is obtained. 1 kg of zirconia beads in a particle size of 2 mm are added into the inlet hopper 10 in advance. The inlet stopper is open, the zirconia beads enter the grinding chamber 21. Further, the raw tea flakes are placed into the inlet hopper 10. The vacuum feeding pump 8 is turned on by the control portion 7, and the vacuum feeding pump 8 is on for 5 seconds. The motor 1 is turned on. The motor 1 is running for 10 in advance, and subsequently, the airflow classifier 4 and the control portion 7 are turned on successively. A valve opening frequency is set to be switching between on and off every 3 seconds (A switch state 1: open the first valve 12 and the second valve 9.2, close the third valve 20 and the fourth valve 9.4. The airflow direction is from the grinding chamber 21 to the airflow classifier 4. A switch state 2: open the third valve 20 and the fourth valve 9.4, close the first valve 12 and the second valve 9.2, turn on the wind guider 14, a machine seal temperature is set to be 80° C.). While grinding, the motor 1 drives the pin bar 3 to rotate, the zirconium beads and the raw tea flakes collide with each other at a high speed, a great friction is generated, a shearing force crushes and grinds the material, and a line speed of a dispersion disk is set to be 4 m/s.

Figure 3:
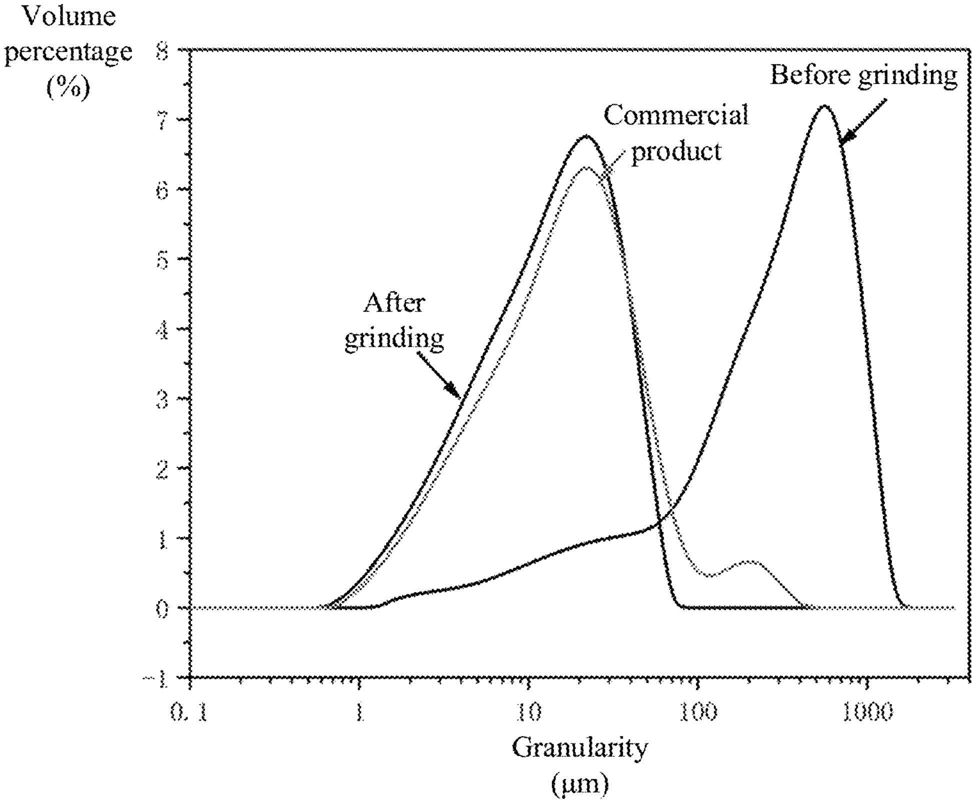
FIG. 3 is a change in particle sizes of matcha powders before and after the grinding shown in the Embodiment II.
Figure 4:
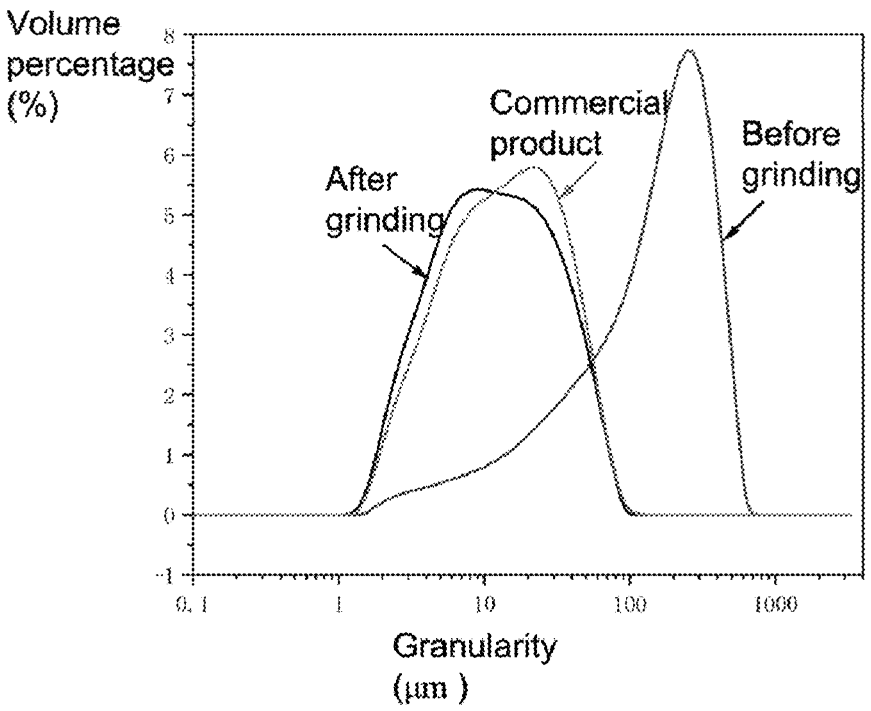
FIG. 4 is a change in particle sizes of matcha powders before and after the grinding shown in the Embodiment III.

A color of the produced matcha is bright, turquoise. The produced matcha has a strong seaweed aroma. The particle size and the color of the matcha powders are measured by a Malvern laser particle size meter and a colorimeter. The particle size D of the matcha powders is 16 μm. Compared to commercially available Japanese matcha, the matcha powders produced in the present disclosure has a narrower particle size distribution, and particles of the matcha powders produced in the present disclosure are more uniform. Results are shown in FIG. 3. Compared to stone grinding, the method of the present disclosure has a higher production efficiency. As the materials are grinded, the L-value gradually increases, the b-value gradually decreases, and the a-value gradually increases. It indicates that, during grinding, an original color of the matcha is better retained, and while intracellular chlorophyll is released, the intracellular chlorophyll is less oxidized. After processing, the colour of matcha is changed from a dark green to an emerald green, such that the colour of matcha is improved. Active substances, such as tea polyphenols and free amino acids, are measured, and nearly no change is detected before and after the grinding. The active substances are highly retained. In addition, results of particle sizes, colours, free amino acids and theanine are shown in Tables 1~4 below.

TABLE 1

Change in colors before and after grinding, compared to commercially available matcha

| | Before grinding | After grinding | commercially available matcha |
|---|---|---|---|
| L* | 50.26 ± 0.05 | 55.84 ± 0.03 | 53.52 ± 0.02 |
| a* | −3.94 ± 0.03 | −5.84 ± 0.01 | −5.02 ± 0.01 |
| b* | 15.70 ± 0.06 | 23.16 ± 0.03 | 20.16 ± 0.03 |

TABLE 2

Change in polyphenols before and after grinding

| Grinding time length | Content of polyphenols (%) |
|---|---|
| 0 min | 13.10 ± 0.04 |
| 60 min | 14.10 ± 0.06 |
| 100 min | 13.50 ± 0.09 |
| 140 min | 15.15 ± 0.12 |

TABLE 3

Change in free amino acids before and after grinding

| Grinding time length | Content of free amino acids (%) |
|---|---|
| 0 min | 2.78 ± 0.02 |
| 60 min | 2.57 ± 0.04 |
| 100 min | 2.77 ± 0.02 |
| 140 min | 2.71 ± 0.02 |

TABLE 4

Change in theanine before and after grinding

| Grinding time length | Content of theanine (%) |
|---|---|
| 0 min | 0.33 ± 0.01 |
| 60 min | 0.29 ± 0.01 |
| 100 min | 0.35 ± 0.01 |
| 140 min | 0.39 ± 0.00 |

Embodiment III

The raw tea flakes are spring tea, and the other operations are the same as those in the Embodiment II and will not be repeated herein. The produced matcha powders are more fine, in a bright green color. The colour of the tea flakes are changed from the dark green to the emerald green before and after grinding. Compared to commercially available Japanese matcha, the matcha powders produced in the present disclosure has a narrower particle size distribution, and particles of the matcha powders produced in the present disclosure are more uniform. Table 5 in the following shows a change in the L value, a change in the b value, and a change in the value before and after the grinding. It indicates that, during grinding, an original color of the spring tea is better retained, and while intracellular chlorophyll is released, the intracellular chlorophyll is less oxidized. After processing, the colour of matcha is changed from a dark green to an emerald green, such that the colour of matcha is improved.

TABLE 5

Change in colors before and after grinding

| | Before grinding | After grinding |
|---|---|---|
| L* | 52.69 ± 0.23 | 64.47 ± 0.02 |
| a* | −4.17 ± 0.02 | −7.11 ± 0.01 |
| b* | 18.23 ± 0.51 | 28.76 ± 0.06 |

In summary, the device of the present disclosure may better control the temperature during the grinding process, the materials have little or no contact with substances such as iron or copper during the grinding process. Therefore, matcha powders, which are in good quality and are safe, may be produced continuously. Details include the following.

1. The cooling case 24 is disposed between the outer shell 23 and the inner shell 24 of the stirred media mill grinding portion 2. In the grinding process, a better cooling effect is achieved, and heat can be absorbed in time, particle sizes of the matcha powders are reduced, and color quality is ensured. The inner shell 24 is made of silicon carbide ceramic, having high hardness, resistant to corrosion, prevented from being rust, and suitable for grinding food materials.
2. The device is highly automated. The matcha that is inadequately grinded can be returned to the grinding chamber 21 to be further grinded. During production, the material may not mix with the air, and nearly no waste is generated, the production area is safe and hygienic.

3. A change in airflow directions within the grinding chamber 21 is achieved by controlling opening and closing of different valves, such that the airflow direction may not be a single direction, the grinding chamber 21 may not be blocked, and the part of the grinding products that do not meet requirements may enter the grinding chamber 21 to be further grinded.
4. During feeding, a rate of feeding materials to the vacuum feeding pump 8 is automatically controlled by the control portion 7 to control the amount material to be fed.

The above shows only preferred embodiments of the present disclosure and is not intended to limit the scope of the present disclosure. Any equivalent structure or equivalent process transformation performed based on the contents of the specification and accompanying drawings of the present disclosure, directly or indirectly applied in other related fields, shall be equally covered by the scope of the present disclosure.

The invention claimed is:

1. A device for producing matcha powder, comprising:

a stirred media mill grinding portion, having a grinding chamber inside, wherein the grinding chamber is configured to receive raw tea flakes and a grinding media, a side of the stirred media mill grinding portion defines an outlet port;

a pin bar, rotatably received in the grinding chamber, wherein the pin bar is configured to stir the raw tea flakes and the grinding media in the grinding chamber, enabling the grinding media to initially grind the raw tea flakes; the pin bar is hollow inside, and an outer circumference of the pin bar defines an opening, communicated with the grinding chamber;

an air classifier, connected to the outlet port through a first tube assembly and defining a first output port and a second output port;

a storage portion, connected to the first output port;

a collector portion, connected to the second output port through a second tube assembly; and a wind guider, wherein an air outlet of the wind guider is connected, via a third tube assembly, to the outlet port and an interior of the storage portion to create a negative pressure environment.

2. The device according to claim 1, further comprising: a material feeding assembly, wherein the material feeding assembly is connected to the grinding chamber to allow the raw tea flakes and the grinding media to enter the grinding chamber through the material feeding assembly; and the material feeding assembly comprises:

an inlet tube, connected to a top of the stirred media mill grinding portion and communicated with the grinding chamber;

a vacuum feeding pump, wherein a lower end of the vacuum feeding pump is connected to the inlet tube;

an inlet hopper, connected to an upper end of the vacuum feeding pump, wherein an inlet baffle is arranged inside the inlet hopper; and an inlet baffle controller, electrically connected to the inlet baffle.

3. The device according to claim 2, further comprising: a first valve assembly, wherein the first valve assembly comprises:

a control portion, electrically connected to the inlet baffle controller;

a first valve, arranged on the second tube assembly and electrically connected to the control portion; and a second valve, communicated with the air output of the wind guider and electrically connected to the control portion.

4. The device according to claim 3, further comprising:

a filter, arranged on an air inlet of the wind guider;

a second valve assembly, arranged on the third tube assembly and electrically connected to the control portion;

a collector box, configured to receive the collector portion and all or a part of the filter, wherein the air inlet of the wind guider is located inside the collector box, and the air outlet of the wind guider is located outside the collector box.

5. The device according to claim 4, wherein the second valve assembly comprises:

a third valve, arranged on the third tube assembly and electrically connected to the control portion; and a fourth valve, connected to the collector portion and electrically connected to the control portion.

6. The device according to claim 4, further comprising:

a first air purification assembly, connected to an interior of the material feeding assembly to purify air entering the material feeding assembly; and/or a second air purification assembly, connected to the second tube assembly to purify air entering the second tube assembly; and/or a third air purification assembly, connected to the third tube assembly, wherein the third air purification assembly is disposed between the second valve assembly and the air outlet of the wind guider and is configured to purify air entering the third tube assembly.

7. The device according to claim 3, further comprising:

an outlet baffle, openably arranged on the collector box; and an outlet baffle controller, electrically connected to the control portion and the outlet baffle.

8. The device according to claim 1, wherein a screener is arranged inside the pin bar and is connected with the outlet port, the screener and the pin bar are coaxially arranged with each other, and the screener is configured to filter the grinding media.

9. The device according to claim 1, wherein the stirred media mill grinding portion comprises an outer shell, an inner shell and a cooling case, the cooling case is disposed between the outer shell and the inner shell, and the inner shell defines the grinding chamber inside.

10. The device according to claim 1, further comprising a motor, wherein a power output end of the motor is connected to the pin bar to drive the pin bar to rotate.

* * * * *